(12) United States Patent
Li et al.

(10) Patent No.: US 10,175,409 B2
(45) Date of Patent: Jan. 8, 2019

(54) BACKLIGHT MODULE AND DISPLAY APPARATUS

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Fulin Li, Qingdao (CN); Jihang Ma, Qingdao (CN); Minhua Li, Qingdao (CN)

(73) Assignees: HISENSE ELECTRIC CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 112 days.

(21) Appl. No.: 15/294,583

(22) Filed: Oct. 14, 2016

(65) Prior Publication Data
US 2017/0168217 A1    Jun. 15, 2017

(30) Foreign Application Priority Data
Dec. 11, 2015 (CN) .......................... 2015 1 0930072

(51) Int. Cl.
*G02F 1/1335* (2006.01)
*F21V 8/00* (2006.01)

(52) U.S. Cl.
CPC ......... *G02B 6/0026* (2013.01); *G02B 6/0068* (2013.01); *G02B 6/0073* (2013.01)

(58) Field of Classification Search
CPC .......................................... G02F 2001/133614
See application file for complete search history.

(56) References Cited

U.S. PATENT DOCUMENTS

| | | | | |
|---|---|---|---|---|
| 2013/0294107 A1* | 11/2013 | Ohkawa | ............ | G02F 1/133615 362/606 |
| 2014/0185271 A1* | 7/2014 | Hyun | ................... | G02B 6/0021 362/84 |

(Continued)

FOREIGN PATENT DOCUMENTS

| CN | 103228983 A | 7/2013 |
|---|---|---|
| CN | 103375772 A | 10/2013 |

(Continued)

OTHER PUBLICATIONS

The Chinese First Examination Report of corresponding China patent application No. 201510930072.0, dated Jan. 17, 2018.

*Primary Examiner* — Thanh-Nhan P Nguyen
(74) *Attorney, Agent, or Firm* — J.C. Patents

(57) ABSTRACT

A backlight module and a display apparatus are provided. The backlight module includes: a light bar, a quantum dot encapsulated tube and a light guide plate; the light bar and light guide plate are disposed at two sides of quantum dot encapsulated tube respectively, the light bar and quantum dot encapsulated tube are disposed in parallel, the light bar and quantum dot encapsulated tube are located at a light incident surface side of light guide plate, a plurality of LED lights are disposed on the light bar at a side facing towards the quantum dot encapsulated tube, an LED light corresponding to valid area of quantum dot encapsulated tube is monochromatic LED light, an LED light corresponding to invalid area of quantum dot encapsulated tube is white LED light, and invalid area of quantum dot encapsulated tube is within irradiation range of the white LED light.

23 Claims, 8 Drawing Sheets

(56) References Cited

U.S. PATENT DOCUMENTS

| | | | |
|---|---|---|---|
| 2015/0103291 A1* | 4/2015 | Li | ........................ G02B 6/0023 349/62 |
| 2015/0226905 A1 | 8/2015 | Yoon et al. | |
| 2015/0268402 A1 | 9/2015 | An et al. | |

FOREIGN PATENT DOCUMENTS

| | | | |
|---|---|---|---|
| CN | 103775925 | A | 5/2014 |
| CN | 104819442 | A | 8/2015 |
| JP | 2015-201539 | A | 11/2015 |
| TW | 200701529 | A | 7/2007 |
| TW | 201344306 | A | 11/2013 |

\* cited by examiner

BACKLIGHT MODULE AND DISPLAY APPARATUS

CROSS-REFERENCE TO RELATED APPLICATIONS

This application claims priority to Chinese Patent Application No. 201510930072.0, filed on Dec. 11, 2015 and entitled "BACKLIGHT MODULE AND DISPLAY APPARATUS", which is hereby incorporated by reference in its entirety.

TECHNICAL FIELD

The present application relates to display technologies and, in particular, to a backlight module and a display apparatus.

BACKGROUND

The market demand for a liquid crystal display increases rapidly since it is thin, lightweight and easy to carry. Currently, with the development of electronic technologies and improvement of consumers' requirements for the TV size and image quality and the like, how to achieve wide color gamut display for the liquid crystal display has become a development priority in the industry.

A backlight module is one of key components of the liquid crystal display, and its function lies in providing sufficient brightness and a uniformly-distributed light source to enable the liquid crystal display to display an image normally. The backlight module is a light source located at the back of the liquid crystal display, and during its operation, the backlight module is emitting light, which forms a desired display image after passing through the liquid crystal display. For a liquid crystal display with high precision and large size, a high-performance backlight module is needed to cooperate therewith. Therefore, with improvement in manufacturing technologies of the liquid crystal display, a higher demand is placed on performance of the backlight module in the trend of its large size and low cost.

SUMMARY

In one aspect, the present application provides a backlight module, including: a light bar, a quantum dot encapsulated tube and a light guide plate; where the light bar and the light guide plate are disposed at two opposing sides of the quantum dot encapsulated tube respectively, the light bar and the quantum dot encapsulated tube are disposed in parallel, both the light bar and the quantum dot encapsulated tube are located at a light incident surface side of the light guide plate, a plurality of light emitting diode (LED) lights are disposed on the light bar, an LED light in the plurality of the LED lights which corresponds to a valid area of the quantum dot encapsulated tube is a monochromatic LED light, and an LED light in the plurality of the LED lights which corresponds to an invalid area on an end portion of the quantum dot encapsulated tube is a white LED light.

In another aspect, the present application provides a display apparatus, including: a liquid crystal display panel, a housing and a backlight module, where both the backlight module and the liquid crystal display panel are disposed in the housing, and a light emergent surface of the backlight module is disposed opposite the liquid crystal display panel.

In the backlight module and the display apparatus provided in the present application, the backlight module includes the light bar, the quantum dot encapsulated tube and the light guide plate; where the light bar and the light guide plate are disposed at two opposing sides of the quantum dot encapsulated tube respectively, the light bar and the quantum dot encapsulated tube are disposed in parallel, both the light bar and the quantum dot encapsulated tube are located at the light incident surface side of the light guide plate, the plurality of light emitting diode (LED) lights are disposed on the light bar, the LED light corresponding to the valid area of the quantum dot encapsulated tube is the monochromatic LED light, and the LED light corresponding to the invalid area on the end portion of the quantum dot encapsulated tube is the white LED light.

BRIEF DESCRIPTION OF DRAWINGS

In order to make technical solutions in embodiments of the present application more clearly, accompanying drawings used for description of the embodiments will be briefly described hereunder. Obviously, the described drawings are merely some embodiments of present application. For persons of ordinary skill in the art, other drawings may be obtained based on these drawings without any creative effort.

DESCRIPTION OF EMBODIMENTS

In order to make objectives, technical solutions, and advantages of embodiments of the present application more clearly, the technical solutions in embodiments of the present application will be described hereunder with reference to the accompanying drawings in embodiments of the present application. Obviously, the described embodiments are only a part of embodiments of the present application, rather than all embodiments of the present application. All other embodiments obtained by persons of ordinary skill in the art based on the embodiments of the present application without any creative effort shall fall into the protection scope of the present application.

Figure 1:
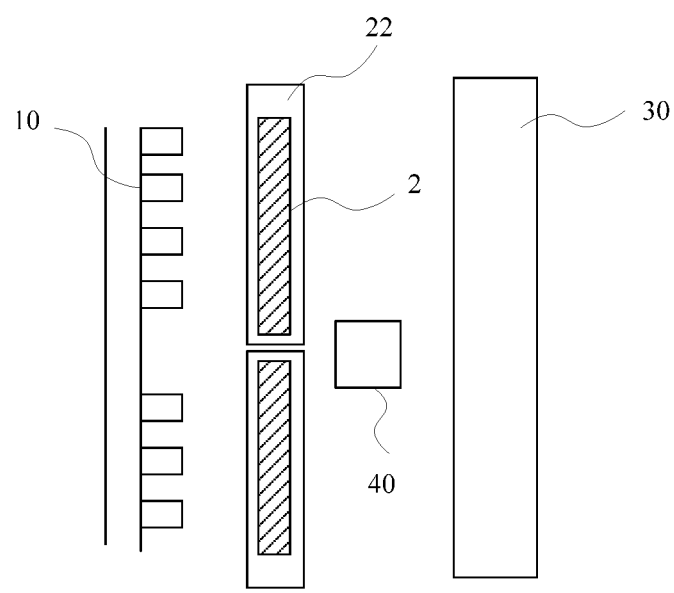
FIG. 1 is a schematic structural diagram of a backlight module.

FIG. 1 is a schematic structural diagram of a backlight module. For an edge-lit backlight module, a quantum dot material may be encapsulated in a glass tube to serve as a quantum dot encapsulated tube, and then a blue light emitting diode (LED) acts as a light source to emit white light of narrow spectra through excitation. During encapsulation of the quantum dot material, it needs to heat and seal the mouth of the glass tube after the quantum dot material is infused into the glass tube; in order to avoid the quantum dot material becoming invalid at a high temperature, an end portion of the glass tube needs to be left with a larger blank area (e.g., more than 7 mm) during the sealing, the blank area is an invalid area where the quantum dot material has not been filled or the quantum dot material becomes invalid. As shown in FIG. 1, in a liquid crystal display of conventional size, by way of jointing two quantum dot encapsulated tubes together, invalid blank areas 22 of respective end portions of two quantum dot encapsulated tubes 2 may be arranged facing towards the edge of the screen after they are jointed together. The joint portions of the two quantum dot encapsulated tubes 2 also have invalid areas without quantum dots.

Figure 2:
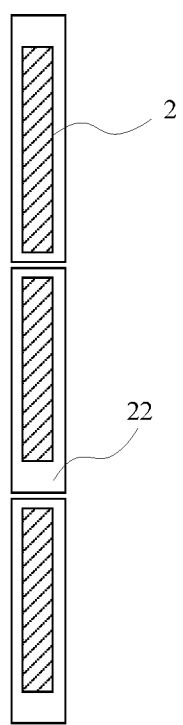
FIG. 2 is a schematic diagram when a plurality of quantum dot encapsulated tubes are jointed together according to some embodiments.

When being applied to a larger liquid crystal display or a curved liquid crystal display, the backlight module generally requires a plurality of quantum dot encapsulated tubes be jointed together. FIG. 2 is a schematic diagram when a plurality of quantum dot encapsulated tubes are jointed together according to some embodiments. As shown in FIG. 2, the joint portions of the quantum dot encapsulated tubes 2 then include end-portion invalid blank areas 22 of greater lengths.

Figure 3:
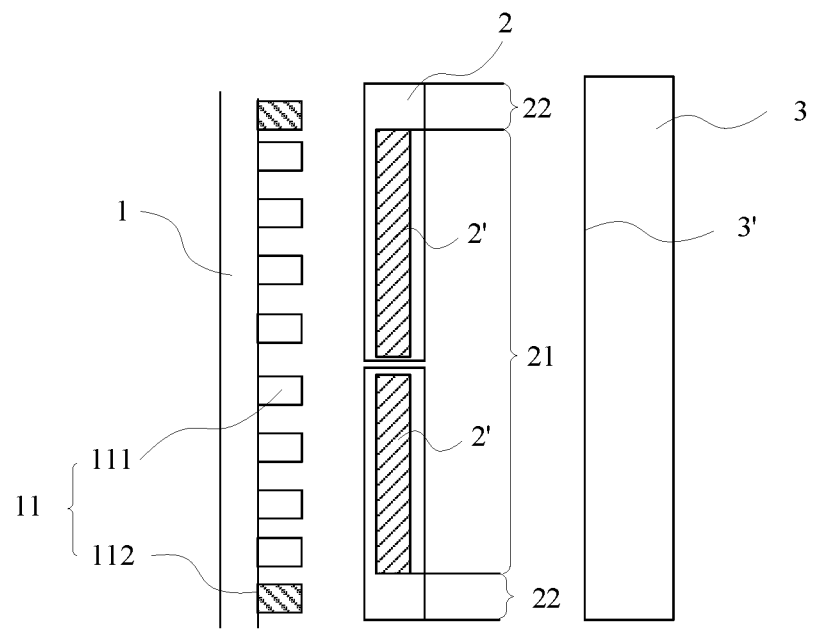
FIG. 3 is a schematic structural diagram of a backlight module according to some embodiments of the present application.

FIG. 3 is a schematic structural diagram of a backlight module according to some embodiments of the present application. The backlight module as shown in FIG. 3 includes a light bar 1, a quantum dot encapsulated tube 2 and a light guide plate 3; where the light bar 1 and the light guide plate 3 are disposed on two opposing sides of the quantum dot encapsulated tube 2 respectively, the light bar 1 and the quantum dot encapsulated tube 2 are disposed in parallel, the light bar 1 and the quantum dot encapsulated tube 2 are located on the side of a light incident surface 3' of the light guide plate 3, the light bar 1 is provided with a plurality of light emitting diode (LED) lights 11, an LED light corresponding to a valid area 21 of the quantum dot encapsulated tube 2 is a monochromatic LED light 111, and an LED light corresponding to an invalid area 22 on an end portion of the quantum dot encapsulated tube 2 is a white LED light 112.

The backlight module includes the light bar 1 and the quantum dot encapsulated tube 2, where the light bar 1 is provided with a plurality of light emitting diode (LED) lights 11, when the light emitted from the LED lights 11 passes through the quantum dot encapsulated tube 2, a quantum dot material 2' in the quantum dot encapsulated tube 2 is excited by the LED lights 11 to produce light; for instance, when the LED lights 11 are emitting blue light, the quantum dot material 2' in the quantum dot encapsulated tube 2 is excited by the blue light to produce yellow light, and the yellow light is mixed with the blue light emitted from the LED lights to produce white light with high purity; after the white light with high purity is diffused via the light guide plate 3, wide color gamut display may be achieved on the liquid crystal display. Generally, the LED lights 11 used for exciting the quantum dot material 2' are monochromatic lights, such as a blue LED light and the like; at this time, the quantum dot material 2' will emit yellow light, or emit red light and green light, or the like.

The quantum dot encapsulated tube 2 may be manufactured using a glass tube. During encapsulation, firstly, the quantum dot material 2' is filled into the glass tube which is closed at one end; and for the other open end of the glass tube, the glass thereof is melted by way of heating, so that the open end is sealed. Since the quantum dot material 2' will become invalid after experiencing a high temperature, the open end needs to be left with a longer length, this end does not have the quantum dot material 2' or the quantum dot material 2' at this end has become invalid at the high temperature, thus the invalid area 22 on the end portion of the quantum dot encapsulated tube 2 is formed. There is no effect, coming from the quantum dot material 2', in the invalid area 22 on the end portion of the quantum dot encapsulated tube 2, thus the light emitted from the LED lights 11 will pass through these areas directly and drop onto the light guide plate 3 when irradiating the quantum dot encapsulated tube 2.

In some embodiments, the plurality of LED lights 11 on the light bar 1 are arranged in a row to form a linear light source, the light bar 1 is in parallel with the quantum dot encapsulated tube 2, and both the light bar 1 and the quantum dot encapsulated tube 2 are provided on the side of the light incident surface 3' of the light guide plate 3, in this way, the light emitted from the LED lights 11 passes through the quantum dot encapsulated tube 2 to produce white light with high purity, which is incident to the light incident surface 3' of the light guide plate 3. When there are two quantum dot encapsulated tubes 2 being jointed together, the joint portion will generally stay away from the end-portion invalid areas 22, that is, the end-portion invalid areas 22 are located on an edge of the screen. Since the end-portion invalid areas 22 have longer lengths (about 7 mm), in order to prevent the monochromatic light from leaking out of the end-portion invalid areas 22 of the quantum dot encapsulated tubes 2 to result in a phenomenon of light leakage at the edge of the screen, the LED lights 11 on the light bar 1 may include two types: monochromatic LED lights 111 and white LED lights 112; the monochromatic LED lights 111 correspond to portions of the quantum dot encapsulated tubes 2 loaded with the quantum dot materials 2', and LED lights at the position of the light bar 1 corresponding to the end-portion invalid areas 22 of the quantum dot encapsulated tubes 2 are the white LED lights 112. Then, the monochromatic light emitted from the monochromatic LED lights 111 on the light bar 1 is incident to the portions of the quantum dot encapsulated tubes 2 loaded with the quantum dot materials 2', white light with high purity may be mixed by exciting the quantum dot materials 2', thus the portions of the quantum dot encapsulated tubes 2 having the quantum dot materials 2' are valid areas 21; the white LED lights 112 are provided at the position corresponding to the end-portion invalid areas 22 of the quantum dot encapsulated tubes 2, the light emitted from the white LED lights 112 is white light, which may directly pass through the glass of the quantum dot encapsulated tubes 2 to be incident to the light incident surface 3' of the light guide plate 3. Since the end-portion invalid areas 22 located on the edge of the screen correspond to the white LED lights 112, the phenomenon of monochromatic light leakage will not occur at the edge, thus the LED lights may stay close to the edge of the screen. At this time, there is no need to use wider bezels to cover these areas, and a more beautiful narrow bezel liquid crystal display screen can be achieved.

Figure 4:
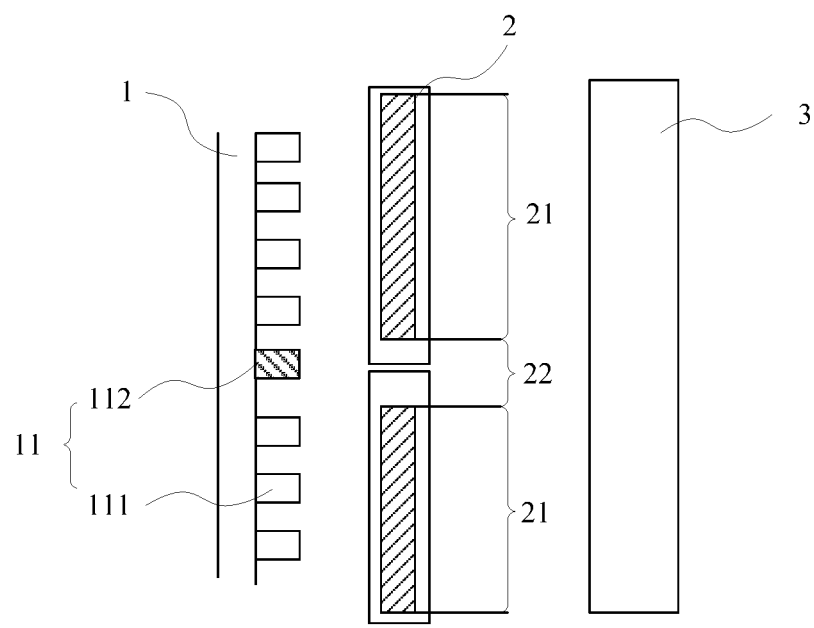
FIG. 4 is a schematic structural diagram of a backlight module according to some other embodiment of the present application.

When the liquid crystal display screen has a large size, or the liquid crystal display screen is a curved screen, a plurality of quantum dot encapsulated tubes 2 need to be jointed head-to-tail successively in the backlight module to form a linear light source of longer length, the number of the quantum dot encapsulated tubes 2 is then more than two generally, as shown in FIG. 2. FIG. 4 is a schematic structural diagram of a backlight module according to some other embodiments of the present application. As shown in FIG. 4, based on the structure as described in FIG. 3 above, the plurality of LED lights 11 on the light bar 1 still includes the monochromatic LED lights 111 and the white LED lights 112, while the number of the quantum dot encapsulated tubes 2 is more than one, and the quantum dot encapsulated tubes 2 are jointed head-to-tail successively. When there are more than one quantum dot encapsulated tubes 2 and they are jointed together, end-portions of the plurality of quantum dot encapsulated tubes 2 require to be jointed face to face, thus a joint portion cannot stay away from the end-portion invalid areas 22 of the quantum dot encapsulated tubes 2, and the end-portion invalid areas 22 at the joint portion have longer lengths, which may generally amount to 8 mm. At this time, in order to prevent the monochromatic light from leaking out of the end-portion invalid areas 22 of the quantum dot encapsulated tubes 2 to result in problems such as screen color cast, the end-portion invalid areas 22 at the joint part of the quantum dot encapsulated tubes 2 are provided with the white LED lights 112, and remaining portions are provided with the monochromatic LED lights 111. The light emitted from the white LED lights 112 is white light, which may directly pass through the glass of the quantum dot encapsulated tubes 2 to be incident to the light incident surface 3' of the light guide plate 3, thus problems such as the color cast or dark regions will not appear during displaying.

It should be noted that, in the case where there are more than one quantum dot encapsulated tubes 2, for any two adjacent quantum dot encapsulated tubes 2 thereof, the invalid areas 22 may be located between the valid areas 21 of these two quantum dot encapsulated tubes 2, as shown in FIG. 4; the invalid areas 22 may also be located at, at least, one end of each of the quantum dot encapsulated tubes 2, as shown in FIG. 3. It can be understood that, the two manners as described above in which the quantum dot encapsulated tubes are jointed together may be included simultaneously in one backlight module.

For the backlight module with the above structure, since the white LED lights 112 are provided at the position of the light bar 1 corresponding to the end-portion invalid areas 22 of the quantum dot encapsulated tubes 2, and the monochromatic LED lights 111 only correspond to the valid areas 21 of the quantum dot encapsulated tubes 2, the light emitted from the monochromatic LED lights 111 of the light bar 1 will not be emergent from the invalid areas 22.

In some embodiments, the monochromatic LED lights 111 in the light bar 1 are blue LED lights. The blue LED lights are usually made of gallium nitride light emitting diodes. When being excited by electric current, the gallium nitride light emitting diodes will produce energy in the form of light, and the blue LED lights may then produce blue light of pure color. White light may be produced after mixing the blue light emitted from the blue LED lights with other colored light. Specifically, the blue light emitted from the blue LED lights may be mixed with yellow light to produce white light, and may also be mixed with red light and green light in three primary colors together to produce white light. The mixed white light has high purity due to its composition of three types of pure color light which have narrow spectra, i.e., red light, green light and blue light, or two types of pure color light, i.e. blue light and yellow light, as well as filtering out other colors of light, and then the entire backlight module is enabled to produce white light with high purity, and thus wide color gamut is achieved on the liquid crystal display screen.

When the monochromatic LED lights 111 in the light bar 1 are blue LED lights, the quantum dot materials 2' for producing red light and green light under excitation are included in the quantum dot encapsulated tubes 2. In some embodiments, the quantum dot materials 2' are quasi-zero dimensional nanocrystals with a grain diameter of 2~10 nanometers. Because the quantum dot materials 2' have small diameters, internal electrons and holes are confined by quantum to become a structure having an energy level; when the quantum dot materials 2' are subject to optical or electrical excitation, they will emit light with different wavelengths and frequencies when the internal energy level changes. Since the emission spectra of the quantum dot materials 2' may be controlled by changing sizes of the quantum dot materials 2', by means of changing the sizes of the quantum dot materials 2' and chemical compositions thereof, the quantum dot materials 2' may be allowed to produce two different colors of light, i.e., red light and green light, under excitation of blue light. For instance, the quantum dot materials 2' having the size of 8 nanometers may present red color, while the quantum dot materials 2' having the size of 2.5 nanometers to 3 nanometers may present green color. Because red, green and blue are three primary colors, red light and green light emitted from the quantum dot materials 2' under excitation of blue light of the blue LED lights may be mixed with the blue light emitted from the blue LED lights themselves to produce white light with high purity.

Figure 7:
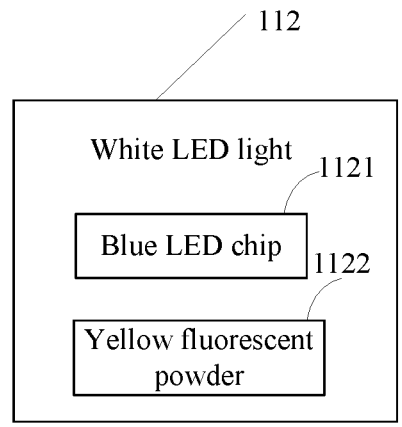
FIG. 7 is a schematic structural diagram of a white LED light according to some embodiments of the present application.
Figure 8:
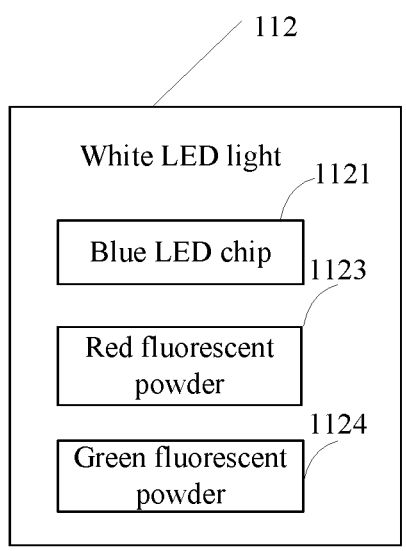
FIG. 8 is a schematic structural diagram of a white LED light according to some other embodiments of the present application.

The white LED lights 112 corresponding to the end-portion invalid areas 22 of the quantum dot encapsulated tubes 2 may also use a principle of polychromatic light mixing to produce white light. At this time, the white LED lights 112 contain fluorescent powder, as shown in FIG. 7 and FIG. 8. The fluorescent powder may produce different colors of light under excitation of external electromagnetic waves. The fluorescent powder includes green fluorescent powder 1124 for producing green light, yellow fluorescent powder 1122 for producing yellow light, red fluorescent powder 1123 for producing red light, etc. Each of the white LED lights 112 may be made by using a blue LED chip 1121; when the blue LED chip is emitting blue light, the fluorescent powder is excited by light emitted from the LED chip to produce other colors of light upon its own characteristic. Different colors of light may be formed after other colors of light are mixed with blue light. For instance, white light may be formed after blue light is mixed with yellow light, and white light may also be formed by mixing blue light, green light and red light together. Thus, each of the white LED lights 112 may use the combination of the blue LED chip with different fluorescent powder to enable the end-portion invalid areas 22 of the quantum dot encapsulated tubes 2 to emit white light.

In some embodiments, white light emitted from the white LED lights 112 has a certain color temperature after they are doped with fluorescent powder, this color temperature involves concentration and ratio of materials of the fluorescent powder in the white LED lights 112, hence during the manufacture of the white LED lights 112, the color temperature of the white light emitted from the white LED lights 112 should be controlled by adjusting the concentration of the fluorescent powder and the ratio of different colors of fluorescent powder, so that it is consistent with a color temperature of white light produced by the monochromatic LED lights 111 through the quantum dot encapsulated tubes 2.

As shown in FIG. 7, in some embodiments, the white LED lights 112 may contain yellow fluorescent powder. The yellow fluorescent powder is used to produce yellow light under excitation. The yellow fluorescent powder is generally made of yttrium aluminate garnet (YAG). When the blue LED chips in the white LED lights 112 are emitting blue light, the yellow fluorescent powder may produce yellow light under excitation of LED, and white light may be formed after the yellow light is mixed with the blue light. Since YAG fluorescent powder has a relatively mature production process, and it only needs to add one color of fluorescent powder to produce white light, there is no need to adjust concentration and ratio of different types of fluorescent powder, the white LED lights as produced have simple structures.

As shown in FIG. 8, in some embodiments, the white LED lights 112 may also contain a mixture of red fluorescent powder and green fluorescent powder. The red fluorescent powder for producing red light is generally nitride fluorescent powder, and the green fluorescent powder is generally silicate or nitrogen oxide fluorescent powder. The white LED lights 112 contain a fluorescent powder mixture mixed by the red fluorescent powder and the green fluorescent powder at a certain ratio. When blue LED chips in the white LED lights 112 are emitting blue light, the red fluorescent powder produces red light under excitation of LED, and the green fluorescent powder produces green light under excitation of LED. The red light and the green light may be mixed with the blue light emitted from the blue LED chips to form white light.

In some embodiments, in the white LED lights 112, the ratio at which the red fluorescent powder is mixed with the green fluorescent powder and the ratio at which the quantum dot materials 2' in the quantum dot encapsulated tubes 2 for producing red light and green light under excitation are mixed should have a certain corresponding relation. When the blue LED lights and the quantum dot encapsulated tubes 2 are acting collectively, the color temperature of the white light produced thereby has a relation with the ratio at which two types of quantum dot materials in the quantum dot encapsulated tubes are mixed, thus, making the ratio of two colors of fluorescent powder in the white LED lights 112 maintain a certain corresponding relation with the ratio at which the quantum dot materials 2' in the quantum dot encapsulated tubes for producing red light and green light under excitation are mixed, for instance, maintaining similar or consistent mixing ratios, may allow the color temperature of the white light emitted from the white LED lights 112 to be close to or consistent with the color temperature of the white light produced by the blue LED lights and the quantum dot encapsulated tubes 2. Thus, color temperatures of the white light emitted from the end-portion invalid areas 22 and the valid areas 21 of the quantum dot encapsulated tubes 2 may be close or the same, thereby avoiding a phenomenon of color cast due to inconsistent color temperatures of the white light emitted from the end-portion invalid areas 22 and the valid areas 21 of the quantum dot encapsulated tubes 2, which is produced when the liquid crystal display is displaying an image.

Figure 5:
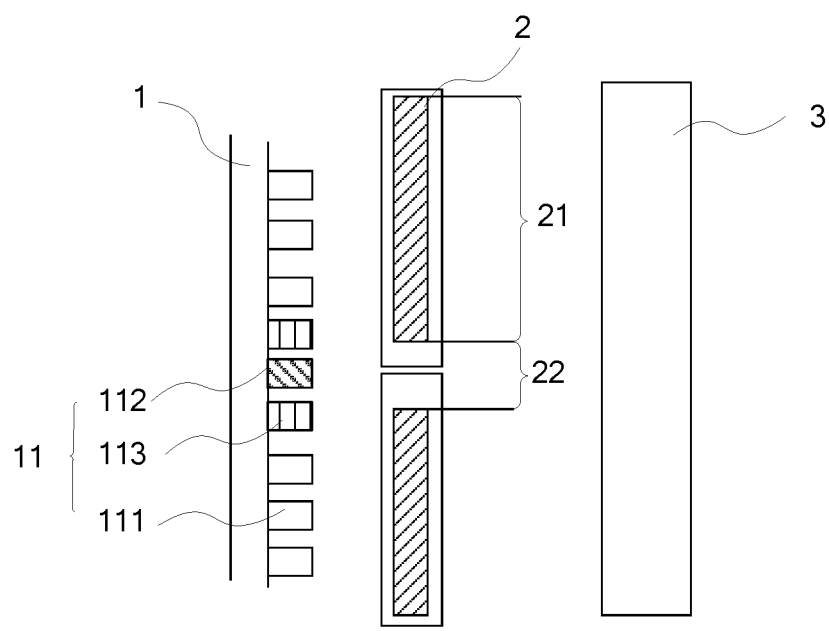
FIG. 5 is a schematic structural diagram of a backlight module according to still some other embodiments of the present application.

In some embodiments, in order to increase overall backlight brightness of the backlight module, a great number of LED lights 11 are generally provided on the light bar 1 in the backlight module, and thus each LED light corresponds to a small area coverage on the quantum dot encapsulated tube 2. Then, the end-portion invalid area 22 of the quantum dot encapsulated tube 2 will also correspond to a plurality of LED lights, where positions of some LED lights are directly facing the end-portion invalid area 22 of the quantum dot encapsulated tube 2, hence emergent light emitted from these LED lights will be incident to the end-portion invalid area 22 in entirety; whereas positions of some LED lights correspond to a joint portion crossing over the valid area 21 and the end-portion invalid area 22 of the quantum dot encapsulated tubes 2, that is, a portion of such an LED light corresponds to the end-portion invalid area 22 of the quantum dot encapsulated tube 2, while the other portion thereof will correspond to the valid area 21 of the quantum dot encapsulated tube 2, thus, when such LED light is emitting light, a portion of emergent light will be incident to the valid area 21 of the quantum dot encapsulated tube 2, while the other portion of emergent light will be incident to the end-portion invalid area 22 of the quantum dot encapsulated tube 2. At this time, if the LED light corresponding to the joint portion of the two types of areas is a blue LED light, blue light leakage will occur in the end-portion invalid area; if this LED light is a white LED light, then the LED light will emit less blue light, which, after the valid area of the quantum dot encapsulated tube is excited, emergent light will present yellowish and dark, still resulting in color cast and dark regions on the screen. In order to avoid this problem, in this embodiment, different transition white LED lights may be provided at the position of the light bar 1 corresponding to the end-portion invalid areas 22 of the quantum dot encapsulated tubes 2 so as to solve the problem of monochromatic light leakage in the end-portion invalid areas 22 or phenomenon of yellow and dark emergent light in the backlight module. A specific arrangement will be described hereunder with regard to disposing the transition white LED lights at the position corresponding to the end-portion invalid areas 22 of the quantum dot encapsulated tubes 2:

FIG. 5 is a schematic structural diagram of a backlight module according to some embodiments of the present application. As shown in FIG. 5, the LED lights corresponding to the joint portions of the end-portion invalid areas 22 of the quantum dot encapsulated tubes 2 and the valid areas 21 of the quantum dot encapsulated tubes 2 are still white LED lights 113, and in these white LED lights 113 corresponding to the joint portions, concentration of fluorescent powder in such an LED light is positively correlated with a proportion that the end-portion invalid area 22 accounts for in the joint area corresponding to this white LED light 113. Specifically, the white LED lights corresponding to the joint portions are still emitting white light, and this may avoid a problem of monochromatic light leakage resulting from irradiation of monochromatic LED lights on the end-portion invalid areas of the quantum dot encapsulated tubes. For the white LED lights 113 corresponding to the joint areas, concentration of fluorescent powder therein is less than the concentration of fluorescent powder in the white LED lights directly facing the end-portion invalid areas 22, thus the color temperature of emergent light emitted from the white LED lights 113 corresponding to the joint portions is lower than that of emergent light emitted from the white LED lights 112 directly facing the end-portion invalid areas 22. In this way, the color temperature of the white LED lights 113 corresponding to the joint areas ranks between that of the monochromatic LED lights 111 corresponding to the valid areas 21 of the quantum dot encapsulated tubes 2 and that of the white LED lights 112 corresponding to the end-portion invalid areas 22 of the quantum dot encapsulated tubes 2, thus a transition zone is formed between the valid areas 21 and the end-portion invalid areas 22, which may guarantee a smaller color temperature deviation between the valid areas 21 and the end-portion invalid areas 22.

In some embodiments, concentration of fluorescent powder in the white LED light 113 corresponding to the joint portion is positively correlated with a proportion that the end-portion invalid area 22 accounts for in the area corresponding to this LED light. For instance, when the end-portion invalid area 22 accounts for a small proportion in the area corresponding to the white LED light 113 which corresponds to the joint portion, concentration of fluorescent powder in this white LED light is also smaller. Because the white LED light is generally collectively-formed by the blue LED chip and fluorescent powder, the white light emitted from the white LED light contains more blue light, and its color temperate is high; whereas when the end-portion invalid area 22 accounts for a large proportion in the area corresponding to the white LED light 113 which corresponds to the joint portion, concentration of fluorescent powder in this LED light is also high, and a color temperature of light emitted therefrom is low, which is closer to that of light emitted from the white LED light 112 corresponding to the end-portion invalid area 22; if a majority of light of the LED light will be emergent via the end-portion invalid area 22 of the quantum dot encapsulated tube 2, then this LED light is directly provided as the white LED light 112. The concentration of the fluorescent powder in the white LED light 113 corresponding to the joint portion is adjusted upon the proportion that the end-portion invalid area 22 accounts for in the area corresponding to this LED light, which may guarantee a smaller color temperature deviation of the white light between the valid area 21 and the end-portion invalid area 22 of the quantum dot encapsulated tube 2, as well as uniform transition between the white light.

As described above, the white LED lights 113 corresponding to joint portions are provided at the joint portions of the valid areas 21 of the quantum dot encapsulated tubes 2 and the end-portion invalid areas 22 of the quantum dot encapsulated tubes 2, and concentration of fluorescent powder in these LED lights is positively correlated with the proportion that the end-portion invalid areas 22 account for in the joint areas corresponding to these white LED lights. In this way, there may be a small color temperature deviation of the white light between the valid areas 21 and the end-portion invalid areas 22 of the quantum dot encapsulated tubes 2, and uniform transition is presented between the white light, which avoids the phenomenon of blue light leakage occurring in the end-portion invalid areas 22 of the quantum dot encapsulated tubes 2, and meanwhile also prevents emergent light of the backlight module from presenting yellow and dark.

In some embodiments, the backlight module includes the light bar, the quantum dot encapsulated tubes and the light guide plate; where the light bar and the light guide plate are disposed at two opposing sides of the quantum dot encapsulated tubes respectively, the light bar and the quantum dot encapsulated tubes are disposed in parallel, both the light bar and the quantum dot encapsulated tubes are located on the side of the light incident surface 3' of the light guide plate, the light bar is provided with a plurality of light emitting diode (LED) lights, LED lights corresponding to valid areas of the quantum dot encapsulated tubes are monochromatic LED lights, and LED lights corresponding to end-portion invalid areas of the quantum dot encapsulated tubes are white LED lights. In the backlight module with the above structure, white LED lights are provided on the light bar at the position corresponding to the invalid areas of the quantum dot encapsulated tubes, while monochromatic LED lights only correspond to the valid areas of the quantum dot encapsulated tubes, and thus light emitted from the monochromatic LED lights of the light bar will not be emergent from the invalid areas, thereby guaranteeing that the backlight module can emit uniformly emergent white light with high purity, and the liquid crystal display screen is refrained from presenting color cast or dark regions.

Figure 9:
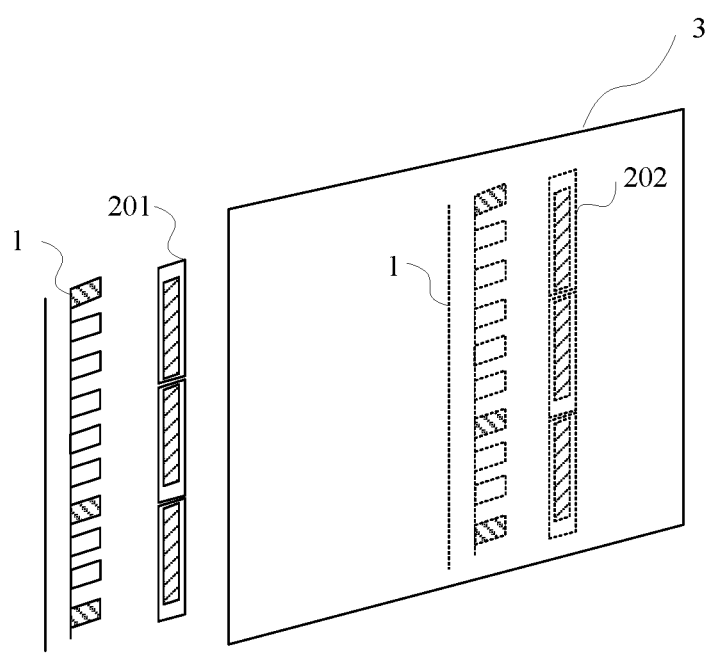
FIG. 9 is a schematic structural diagram of a backlight module including a first type encapsulated tube and a second type encapsulated tube disposed in parallel according to some embodiments of the present application.
Figure 10:
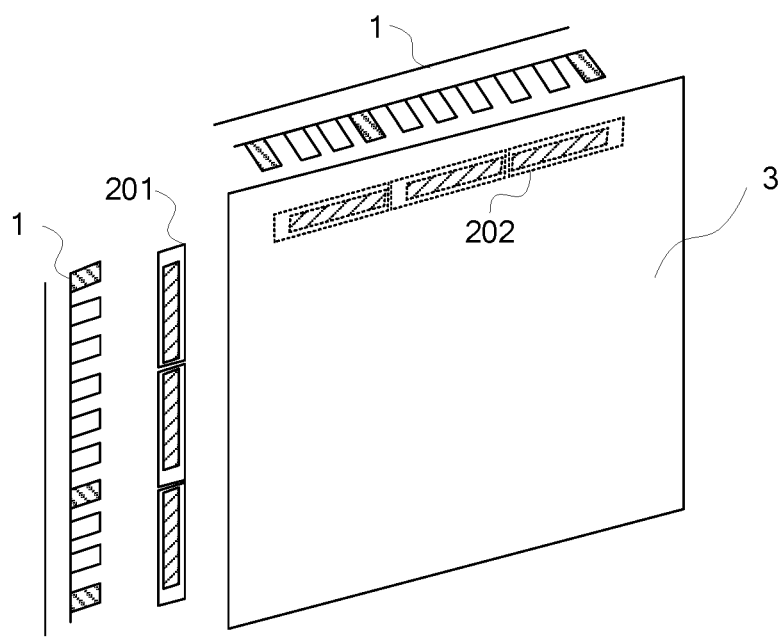
FIG. 10 is a schematic structural diagram of a backlight module including a first type encapsulated tube and a second type encapsulated tube disposed perpendicularly according to some embodiments of the present application.

FIG. 9 is a schematic structural diagram of a backlight module including a first type encapsulated tube and a second type encapsulated tube disposed in parallel according to some embodiments of the present application; FIG. 10 is a schematic structural diagram of a backlight module including a first type encapsulated tube and a second type encapsulated tube disposed perpendicularly according to some embodiments of the present application. In some embodiments, the quantum dot encapsulated tubes 2 in the backlight module may include a first type encapsulated tube 201 and a second type encapsulated tube 202, where the first type encapsulated tube 201 and the second type encapsulated tube 202 may be disposed in parallel, as shown in FIG. 9, and may also be disposed perpendicularly, as shown in FIG. 10. Additionally, other arrangements of the first type encapsulated tube 201 and the second type encapsulated tube 202 are the same as those of the quantum dot encapsulated tubes 2 in the above embodiments, which will not be repeated herein.

Figure 6:
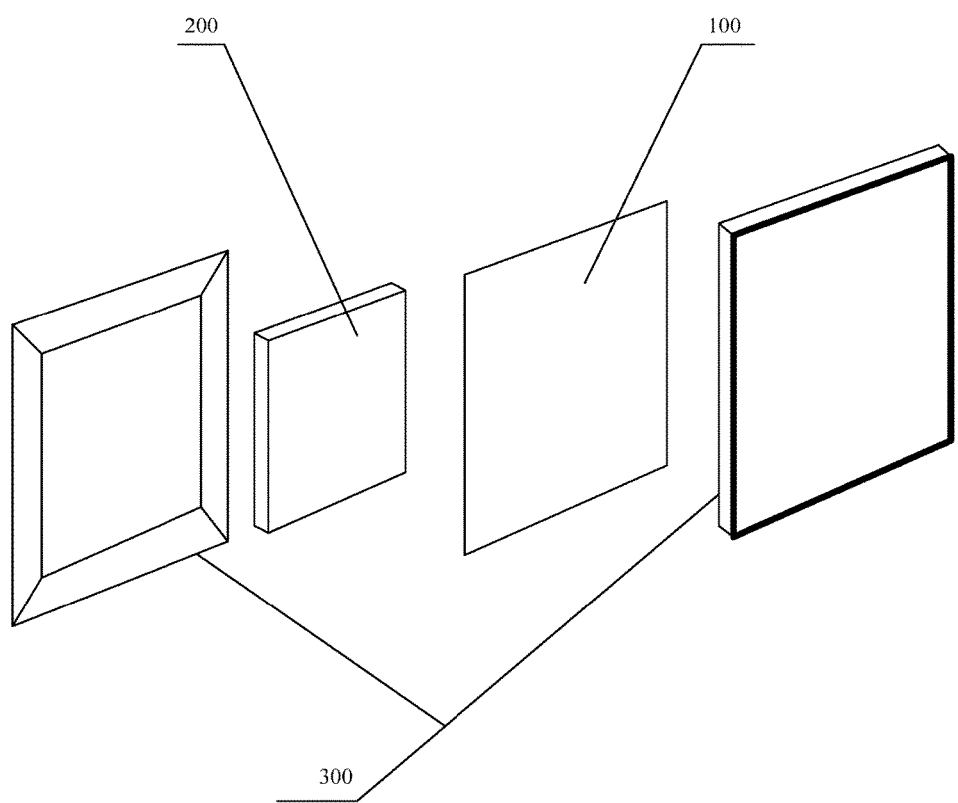
FIG. 6 is a schematic structural diagram of a display apparatus according to some embodiments of the present application.

FIG. 6 is a schematic structural diagram of a display apparatus according to some embodiments of the present application. As shown in FIG. 6, the display apparatus provided in this embodiment includes a housing 300, a liquid crystal display panel 100 and a backlight module 200 as described in the above embodiments, where both the backlight module 200 and the liquid crystal display panel 100 are provided in the housing 300, a light emergent surface of the backlight module 200 is provided opposite the liquid crystal display panel 100. The structure, function and effect of the backlight module 200 have been described in the above embodiments in detail, and will not be repeated herein.

The housing 300 of the display apparatus may include a front frame and a rear frame generally, the liquid crystal display panel 100 is provided in the front frame, and the backlight module 200 is generally located in the rear frame. The light emergent surface in the backlight module 200 is provided opposite the liquid crystal display panel 100, which may supply the liquid crystal display panel 100 with a uniform area light source.

For the display apparatus provided in the above embodiments, its backlight module includes a light bar provided with a plurality of LED lights as well as one or more quantum dot encapsulated tubes; because white LED lights are provided on the light bar at a position corresponding to the invalid areas of the quantum dot encapsulated tubes, while monochromatic LED lights only correspond to the valid areas of the quantum dot encapsulated tubes, light emitted from the monochromatic LED lights of the light bar will not be emergent from the invalid areas, thereby guaranteeing that the backlight module can emit uniformly emergent white light with high purity, and thus the liquid crystal display screen is refrained from presenting local color cast or dark regions at the time of achieving effects of wide color gamut display for the liquid crystal display screen by using the quantum dot materials in the quantum dot encapsulated tubes.

In the above embodiments, the display apparatus includes the housing, the liquid crystal display panel and the backlight module, where both the backlight module and the liquid crystal display panel are provided in the housing, and the light emergent surface of the backlight module is provided opposite the liquid crystal display panel. The backlight module emits light via quantum dot materials, white LED lights are provided on the light bar of the backlight module at the position corresponding to the invalid areas of the quantum dot encapsulated tubes, while monochromatic LED lights only correspond to the valid areas of the quantum dot encapsulated tubes, thus, light emitted from the monochromatic LED lights of the light bar will not be emergent from the invalid areas, thereby guaranteeing that the backlight module can emit uniformly emergent white light with high purity; in this way, the display apparatus may achieve wide color gamut display, and the liquid crystal display screen is refrained from presenting color cast or dark regions during image displaying.

Finally, it should be noted that the foregoing embodiments are merely intended for describing technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. A backlight module, comprising: a light bar, a quantum dot encapsulated tube and a light guide plate; the light bar and the light guide plate are disposed at two sides of the quantum dot encapsulated tube respectively, the light bar and the quantum dot encapsulated tube are disposed in parallel, both the light bar and the quantum dot encapsulated tube are located at a light incident surface side of the light guide plate, a plurality of light emitting diode (LED) lights are disposed on the light bar at a side facing towards the quantum dot encapsulated tube, wherein each monochromatic LED light in the plurality of the LED lights only corresponds to a valid area of the quantum dot encapsulated tube, a white LED light in the plurality of the LED lights corresponds to an invalid area of the quantum dot encapsulated tube, and the invalid area of the quantum dot encapsulated tube is within an irradiation range of the white LED light.

2. The backlight module according to claim 1, wherein, there is one quantum dot encapsulated tube, and the invalid area is located on at least one end of the quantum dot encapsulated tube.

3. The backlight module according to claim 1, wherein, there is a plurality of quantum dot encapsulated tubes, and the plurality of quantum dot encapsulated tubes are successively joint along a longitudinal direction.

4. The backlight module according to claim 3, wherein, the invalid area is located between valid areas of two adjacent quantum dot encapsulated tubes.

5. The backlight module according to claim 3, wherein, the invalid area is located on at least one end of the quantum dot encapsulated tube.

6. The backlight module according to claim 1, wherein, the quantum dot encapsulated tube comprises a first type encapsulated tube and a second type encapsulated tube;
the first type encapsulated tube and the second type encapsulated tube are disposed in parallel, or, perpendicularly.

7. The backlight module according to claim 6, wherein, there is a plurality of first type encapsulated tubes, and the plurality of first type encapsulated tubes are successively joint along a longitudinal direction.

8. The backlight module according to claim 6, wherein, there is a plurality of second type encapsulated tubes, and the plurality of second type encapsulated tubes are successively joint along a longitudinal direction.

9. The backlight module according to claim 1, wherein, the monochromatic LED light is a blue LED light, and the quantum dot encapsulated tube comprises a quantum dot for producing yellow light under excitation.

10. The backlight module according to claim 1, wherein, the monochromatic LED light is a blue LED light, and the quantum dot encapsulated tube comprises quantum dots for producing red light and green light under excitation.

11. The backlight module according to claim 1, wherein, the white LED light comprises a first white LED light, the first white LED light corresponds to a joint area at which the valid area and the invalid area are joined together, wherein the joint area comprises a portion of the valid area and a portion of the invalid area, the joint area is within an irradiation range of the first white LED light, and concentration of fluorescent powder in the first white LED light corresponding to the joint area is positively correlated with a proportion that the portion of the invalid area accounts for in the joint area.

12. The backlight module according to claim 11, wherein the white LED light comprises a second white LED light, wherein the second white LED light corresponds to the invalid area of the quantum dot encapsulated tube but does not correspond to the valid area of the quantum dot encapsulated tube, and concentration of the fluorescent powder in the first white LED light is less than concentration of the fluorescent powder in the second white LED light.

13. The backlight module according to claim 1, wherein there is no quantum dot in the invalid area.

14. The backlight module according to claim 1, wherein light from the white LED light is capable of passing through the invalid area directly.

15. A display apparatus, comprising: a liquid crystal display panel, a housing and a backlight module, both the backlight module and the liquid crystal display panel are disposed in the housing, and a light emergent surface of the backlight module is disposed opposite the liquid crystal display panel;
the backlight module comprises: a light bar, a quantum dot encapsulated tube and a light guide plate; the light bar and the light guide plate are disposed at two sides of the quantum dot encapsulated tube respectively, the light bar and the quantum dot encapsulated tube are disposed in parallel, both the light bar and the quantum dot encapsulated tube are located at a light incident surface side of the light guide plate, a plurality of light emitting diodes (LED) lights are disposed on the light bar at a side facing towards the quantum dot encapsulated tube, wherein each monochromatic LED light in the plurality of the LED lights only corresponds to a valid area of the quantum dot encapsulated tube, a white LED light in the plurality of the LED lights corresponds to an invalid area of the quantum dot encapsulated tube, and the invalid area of the quantum dot encapsulated tube is within an irradiation range of the white LED light.

16. The display apparatus according to claim 15, wherein, there is one quantum dot encapsulated tube, and the invalid area is located on at least one end of the quantum dot encapsulated tube.

17. The display apparatus according to claim 15, wherein, the backlight module comprises a plurality of quantum dot encapsulated tubes, and the plurality of quantum dot encapsulated tubes are successively joint along a longitudinal direction.

18. The display apparatus according to claim 17, wherein, the invalid area is located between valid areas of two adjacent quantum dot encapsulated tubes.

19. The display apparatus according to claim 17, wherein, the invalid area is located on at least one end of the quantum dot encapsulated tube.

20. The display apparatus according to claim 15, wherein, the quantum dot encapsulated tube comprises a first type encapsulated tube and a second type encapsulated tube; the first type encapsulated tube and the second type encapsulated tube are disposed in parallel, or, perpendicularly.

21. The display apparatus according to claim 20, wherein, there is a plurality of first type encapsulated tubes, and the plurality of first type encapsulated tubes are successively joint along a longitudinal direction.

22. The display apparatus according to claim 20, wherein, there is a plurality of second type encapsulated tubes, and the plurality of second type encapsulated tubes are successively joint along a longitudinal direction.

23. The display apparatus according to claim 15, wherein, the white LED light comprises a first white LED light, the first white LED light corresponds to a joint area at which the valid area and the invalid area are joined together, wherein the joint area comprises a portion of the valid area and a portion of the invalid area, the joint area is within an irradiation range of the first white LED light, and concentration of fluorescent powder in the first white LED light corresponding to the joint area is positively correlated with a proportion that the portion of the invalid area accounts for in the joint area.

* * * * *